(12) United States Patent
Van Willigenburg

(10) Patent No.: US 11,046,893 B2
(45) Date of Patent: Jun. 29, 2021

(54) PROCESS AND A SYSTEM FOR HYDROCARBON STEAM CRACKING

(71) Applicant: SABIC GLOBAL TECHNOLOGIES B.V., Bergen Op Zoom (NL)

(72) Inventor: Joris Van Willigenburg, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/339,593

(22) PCT Filed: Oct. 4, 2017

(86) PCT No.: PCT/IB2017/056124
§ 371 (c)(1),
(2) Date: Apr. 4, 2019

(87) PCT Pub. No.: WO2018/065919
PCT Pub. Date: Apr. 12, 2018

(65) Prior Publication Data
US 2019/0284485 A1    Sep. 19, 2019

(30) Foreign Application Priority Data

Oct. 7, 2016 (EP) ..................................... 16192716

(51) Int. Cl.
*C10G 9/36* (2006.01)
*C10G 7/00* (2006.01)
(Continued)

(52) U.S. Cl.
CPC .............. *C10G 9/36* (2013.01); *B01D 3/38* (2013.01); *B01J 12/005* (2013.01);
(Continued)

(58) Field of Classification Search
None
See application file for complete search history.

(56) References Cited

U.S. PATENT DOCUMENTS

| 1,877,811 A | 9/1932 | Coleman |
| 3,886,062 A | 5/1975 | Peiser et al. |

(Continued)

FOREIGN PATENT DOCUMENTS

| WO | WO 2016/146326 | 9/1916 |
| WO | WO 2008/131330 | 10/2008 |
| WO | WO 2015/128034 | 9/2015 |

OTHER PUBLICATIONS

European Office Action issued in corresponding European Patent Application No. 17792192.1, dated Feb. 26, 2020.
(Continued)

*Primary Examiner* — Tam M Nguyen
(74) *Attorney, Agent, or Firm* — Norton Rose Fulbright US LLP

(57) ABSTRACT

A process for steam cracking hydrocarbon feedstock in a steam cracking furnace, the process comprising superheating hydrocarbon feedstock using flue gas from a radiant section of the steam cracking furnace in hydrocarbon feedstock superheating means or the hydrocarbon feedstock superheater, superheating steam from the steam generator using the flue gas from the radiant section of the steam cracking furnace in second heat exchanging means or a second heat exchanger, steam cracking the super-heated hydrocarbon feedstock from the hydrocarbon feedstock superheating means or the hydrocarbon feedstock superheater into cracked gas in a fired tubular reactor, vaporizing the hydrocarbon feedstock, using hydrocarbon feedstock vaporizing means, wherein the hydrocarbon feedstock vaporizing means or the hydrocarbon feedstock vaporizer are heated with a heat transfer medium having a temperature less than or equal to 350° C. and feeding the vaporized hydrocarbon feedstock to the steam cracking furnace.

13 Claims, 5 Drawing Sheets

(51) Int. Cl.
- *B01D 3/38* (2006.01)
- *B01J 12/00* (2006.01)
- *B01J 19/00* (2006.01)
- *B01J 19/24* (2006.01)
- *C10G 55/04* (2006.01)

(52) U.S. Cl.
CPC ....... *B01J 19/0013* (2013.01); *B01J 19/2415* (2013.01); *C10G 7/00* (2013.01); *C10G 55/04* (2013.01); *B01J 2219/00103* (2013.01); *B01J 2219/00157* (2013.01); *C10G 2300/807* (2013.01); *C10G 2400/20* (2013.01)

(56) References Cited

U.S. PATENT DOCUMENTS

| | | | |
|---|---|---|---|
| 6,153,087 | A | 11/2000 | Bigeard et al. |
| 6,270,654 | B1 | 8/2001 | Colyar et al. |
| 7,214,308 | B2 | 5/2007 | Colyar |
| 7,404,889 | B1 | 7/2008 | Powers |
| 7,704,377 | B2 | 4/2010 | Duddy et al. |
| 7,938,952 | B2 | 5/2011 | Colyar et al. |
| 8,926,824 | B2 | 1/2015 | Morel |
| 9,005,430 | B2 | 4/2015 | Fournier et al. |
| 9,840,674 | B2 | 12/2017 | Weiss et al. |
| 2004/0004022 | A1 | 1/2004 | Stell et al. |
| 2007/0232846 | A1 | 10/2007 | Baumgartner et al. |
| 2008/0093261 | A1 | 4/2008 | Powers et al. |
| 2008/0093262 | A1 | 4/2008 | Gragnani et al. |
| 2009/0004475 | A1 | 1/2009 | Sadaka et al. |
| 2009/0048475 | A1 | 2/2009 | Powers |
| 2009/0301935 | A1 | 12/2009 | Spicer et al. |
| 2014/0299515 | A1 | 10/2014 | Weiss et al. |
| 2016/0097002 | A1 | 4/2016 | Sundaram |
| 2016/0122666 | A1 | 5/2016 | Weiss et al. |

OTHER PUBLICATIONS

European Search Report issued in Corresponding European Patent Application No. 16192716, dated Mar. 21, 2017.
European Search Report issued in corresponding European Patent Application No. 16192721, dated Mar. 24, 2017.
International Search Report and Written Opinion issued in International Patent Application No. PCT/IB2017/056124, dated Jan. 17, 2018.
International Search Report and Written Opinion issued in International Patent Application No. PCT/IB2017/056129, dated Jan. 17, 2018.
Zimmerman & Walzl, "Ethylene" *Ullman's Encycolopedia of Industrial Chemistry*, 2012, vol. 13, pp. 465-529.
Office Action issued in counterpart Eurasian Patent Application No. 201990881, dated Nov. 20, 2020.
Search Report and Written Opinion issued in corresponding Singaporean Patent Application No. 11201902222S, dated May 14, 2020 (10 pages).

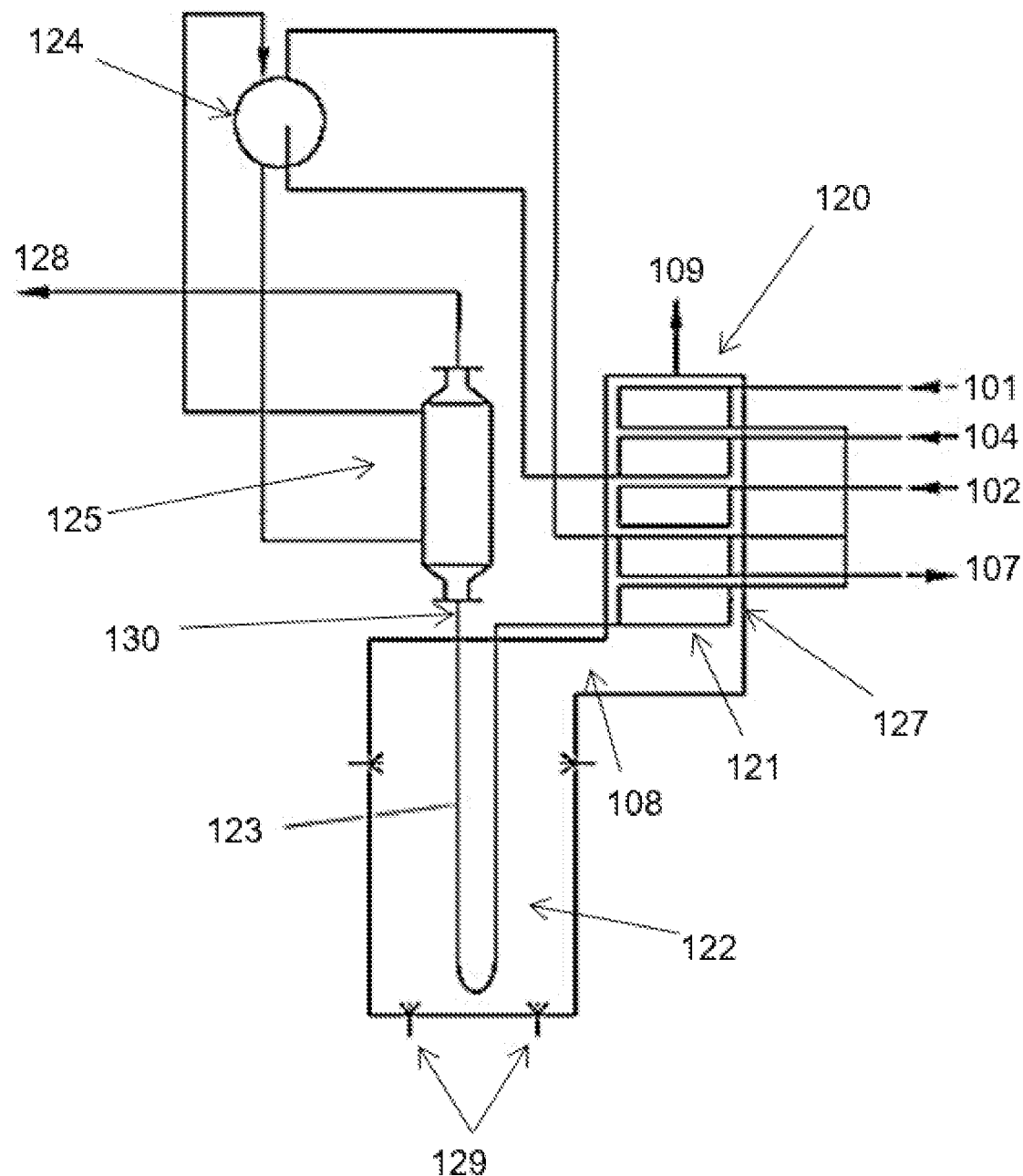
Fig. 1 (state of the art)

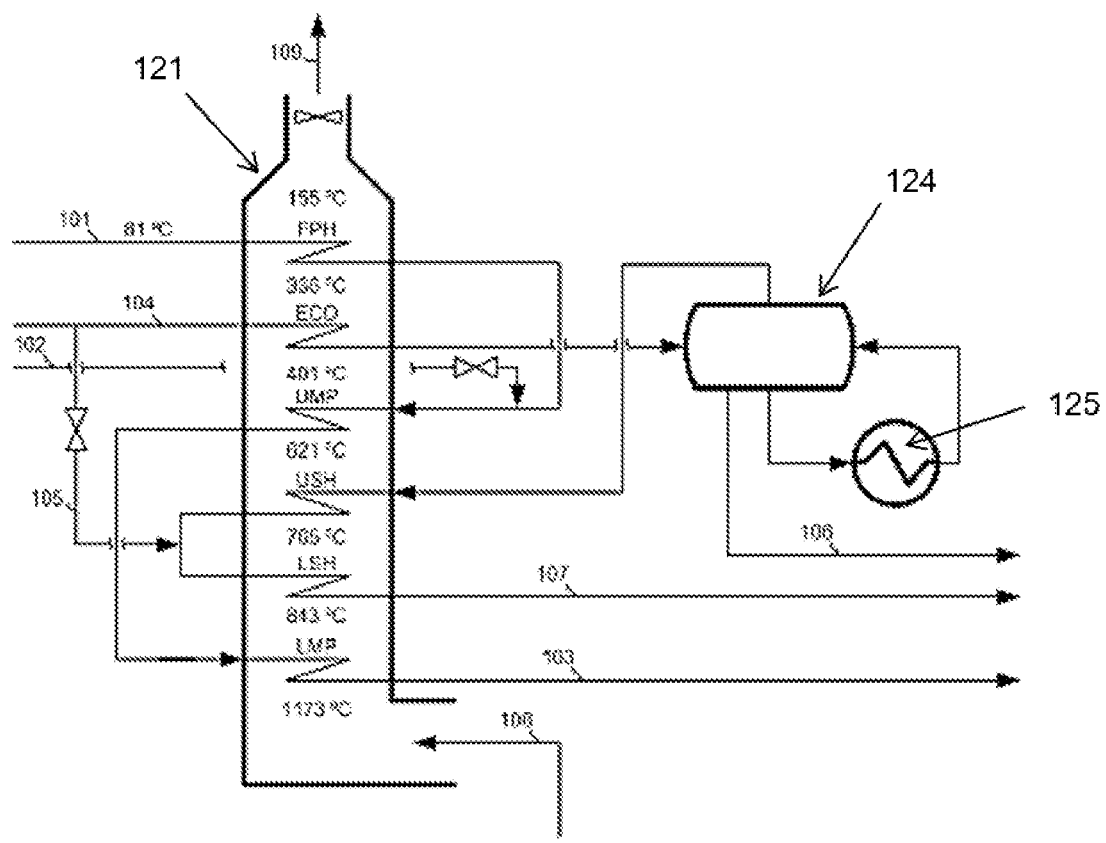
Fig. 1a (state of the art)

PROCESS AND A SYSTEM FOR HYDROCARBON STEAM CRACKING

CROSS-REFERENCE TO RELATED APPLICATION

This application is a national phase under 35 U.S.C. § 371 of International Application No. PCT/IB2017/056124, filed Oct. 4, 2017, which claims the benefit of priority of European Patent Application No. 16192716.5 filed Oct. 7, 2016, the entire contents of each of which are hereby incorporated by reference in their entirety.

FIELD OF THE INVENTION

The invention relates to a process and a system for hydrocarbon steam cracking.

BACKGROUND

Steam cracking is a petrochemical process wherein saturated hydrocarbons having long molecular structures are broken down into smaller saturated or unsaturated molecules.

Steam cracking, also referred to as pyrolysis, has long been used to crack various hydrocarbon feedstocks into olefins, preferably light olefins such as ethylene, propylene, and butylenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place.

The stream then enters a fired tubular reactor (radiant tube or radiant coil) where, under controlled residence time, temperature profile, and partial pressure, it is normally heated from 500-650° C. to 750-875° C. for a duration normally in a range of 0.1-0.5 s. During this short reaction time hydrocarbons in the feedstock are cracked into smaller molecules; ethylene, other olefins, and diolefins are the major products. Since the conversion of saturated hydrocarbons to olefins in the radiant tube is highly endothermic, high energy input rates are needed. The reaction products leaving the radiant tube at 800-850° C. can be cooled to 550-650° C. within 0.02-0.1 s to prevent degradation of the highly reactive products by secondary reactions. The resulting products, including olefins, leave the pyrolysis furnace for further downstream processing, including quenching.

The resulting product mixtures, which can vary widely, depending on feedstock and severity of the cracking operation, are then separated into the desired products by using a complex sequence of separation and chemical-treatment steps. The cooling of the cracked gas is performed in a transfer line exchanger by vaporization of high-pressure boiler feed water (BFW, 6-12 MPa), which is separated in the steam drum and subsequently superheated in the convection section to high-pressure superheated steam (VHP), 5-12 MPa).

Steam cracking is an energy intensive petrochemical process. The cracking furnaces are the largest fuel consumers in a steam cracking plant. In the case of a steam cracker cracking a liquid hydrocarbon feedstock, such as naphtha, about 10% of the heat released in the furnace is used for preheating and evaporating the feed.

The hydrocarbon feedstock is originating from upstream refinery processes such as an atmospheric distillation tower, hydrocracker, FCC, coker, resid hydrocracker. These processes are or contain fractionating processes that at one stage have the naphtha as a vapor stream. The mentioned fractionating processes typically employ steam that comes as vapor with the naphtha fraction and needs to be separated out to have an on-spec naphtha.

However, these fractionating processes operate at near ambient pressures, while for the naphtha vapor in the furnace at pressure of approximately 0.6-0.8 MPa is required to overcome the pressure drop over the remaining convection banks, cracking coils, etc.

It is also not just possible to raise the pressure of these fractionating processes, since this will influence the separation or/and requires a higher temperature at the bottom, which will result in undesired thermal cracking of the hydrocarbons in the fractionating process.

OBJECTS OF THE INVENTION

It is an object of the invention to perform steam cracking of hydrocarbon feedstock while conserving steam cracking furnace convection section energy consumption for evaporating the hydrocarbon feedstock.

SUMMARY OF THE INVENTION

The object is achieved in a process for steam cracking hydrocarbon feedstock in a steam cracking furnace, the process comprising:

superheating hydrocarbon feedstock using flue gas from a radiant section of the steam cracking furnace in hydrocarbon feedstock superheating means or a hydrocarbon feedstock superheater;

superheating steam from the steam generator using the flue gas from the radiant section of the steam cracking furnace in second heat exchanging means or a second heat exchanger;

steam cracking the super-heated hydrocarbon feedstock from the hydrocarbon feedstock superheating means or the hydrocarbon feedstock superheater into cracked gas in a fired tubular reactor;

vaporizing the hydrocarbon feedstock external of the steam cracking furnace, using hydrocarbon feedstock vaporizing means or a hydrocarbon feedstock vaporizer, wherein the hydrocarbon feedstock vaporizing means or the hydrocarbon feedstock vaporizer are heated with a heat transfer medium having a temperature less than or equal to 350° C., and directly feeding the vaporized hydrocarbon feedstock to the hydrocarbon feedstock superheating means or the hydrocarbon feedstock superheater in the convection section of the steam cracking furnace.

By vaporizing the hydrocarbon feedstock using relatively low temperature heat transfer medium, and directly feeding the vaporized feedstock to the steam cracking furnace, the steam cracking furnace no longer requires to vaporize the hydrocarbon feedstock. Thus energy becomes available for increased VHP steam production. The VHP production can be increased by dimensioning convection banks in the convection section for steam production with a larger energy absorption. As the vaporizing of the hydrocarbon feedstock is performed using low grade heat transfer medium, high grade superheated VHP steam production can be enhanced by the low grade low pressure (LP) and medium pressure (MP) steam. In other words, expensive high grade steam can be produced using relatively cheap heat transfer medium.

The temperature of the heat transfer medium is below the temperature of around 350° C. where in the art in a convection section of a steam cracking furnace for vaporizing liquid hydrocarbon feedstock is operated. The heat transfer medium can be any medium available such as at least one of low or medium pressure steam, quench water, quench oil, etc. The low or medium pressure steam can be low or medium pressure stripping steam.

In an embodiment, the vaporizing the hydrocarbon feedstock comprises pressurizing the hydrocarbon feedstock using a hydrocarbon feedstock pump, preheating the pressurized hydrocarbon feedstock in a first heat exchanger, and distilling the preheated hydrocarbon feedstock in a medium pressure distillation column connected to the first heat exchanger, wherein the medium pressure distillation column is operated at an absolute pressure in a range of 0.7 to 1.2 MPa.

A heat exchanger and a medium pressure distillation column connected to the heat exchanger can be used for separation of lighter components from hydrocarbon feedstock, i.e. crude oil. The heat exchanger and medium pressure distillation column can be heated using low grade heat source, such as medium pressure steam, or other low grade sources. In this pressure range the naphtha leaves the column as a vaporized hydrocarbon feedstock with sufficient pressure for use in the steam cracker furnace. This allows a pressurized naphtha vapor to be separated from the hydrocarbon feedstock, which can be advantageously used in the steam cracker furnace, thereby making a vaporizing convection bank in the furnace superfluous. This leaves more steam cracker furnace capacity for producing superheated very high pressure steam. Thus more superheated very high pressure steam can be produced using a low grade heat medium.

In an embodiment, the process further comprises further distilling the hydrocarbon feedstock in the medium pressure distillation column using medium pressure stripping steam having an absolute pressure in a range of 0.8-2.0 MPa.

In an embodiment, the medium pressure stripping steam has a temperature in a range of 180-350° C.

In an embodiment, the heat exchanger is heated using a heat transfer medium having a temperature in a range of 160-350° C. The heat for the first heat exchanger can be obtained from various sources, such as medium pressure steam, medium pressure stripping steam, quench oil, etcetera. This also applies to heating the medium pressure distillation column, which can be heated in similar ways.

In a further embodiment, the vaporizing the hydrocarbon feedstock further comprises preheating fluid components of the hydrocarbon feedstock from the medium pressure distillation column (C-301) through heat exchange in a second heat exchanger, and distilling the hydrocarbon feedstock in a low pressure distillation column into at least one of a light distillate fraction and a middle distillate fraction and a heavy distillate fraction, wherein the low pressure distillation column is operated at an absolute pressure in a range of 0.1-0.6 MPa.

In an embodiment, the process further comprises distilling the hydrocarbon stream in a low pressure distillation column using low pressure stripping steam having an absolute pressure in a range of 0.1-0.7 MPa.

In an embodiment, the vaporizing the hydrocarbon feedstock comprises preheating in a multistage heat exchanging means or multistage heat exchanger. This allows stepwise, gradual increase in temperature of the hydrocarbon feedstock and vaporizing it using low value heat sources.

In a further embodiment, the preheating in the multistage heat exchanging means or multistage heat exchanger comprises at least one of preheating the hydrocarbon in a first heat exchanger stage using low pressure steam, preheating the hydrocarbon in a second heat exchanger stage using medium pressure steam, preheating the hydrocarbon in a third heat exchanger stage using high pressure steam.

In another embodiment, the process further comprises injecting steam in at least one steam injection inlets in the hydrocarbon feedstock stream multistage heat exchanging means or multistage heat exchanger.

This allows vaporization of the hydrocarbon feedstock at a lower temperature and thus increased use of lower value heat sources (such as medium and low pressure steam) over higher value heat sources (such a high pressure steam) to produce a hydrocarbon vapor stream.

In another embodiment, the process further comprises preheating boiler feed water for the steam generator using flue gas from the radiant section of the steam cracking furnace in a boiler feed water preheating means or a boiler feed water preheater, superheating the hydrocarbon feedstock in a superheating convection bank.

This allows the convection section to make more energy available for VHP steam production.

The object of the invention is also achieved in a system for steam cracking hydrocarbon feedstock, comprising a steam generator for producing steam, a steam cracking furnace comprising a radiant section for steam cracking the hydrocarbon feedstock and a convection section comprising hydrocarbon feedstock super heating means or a hydrocarbon feedstock super heater for superheating the hydrocarbon feed stock, and steam superheating means or a steam superheater for superheating the steam, and cooler means or a cooler for cooling the cracked gas from the radiant section. The system further comprises hydrocarbon feedstock vaporizing means or a hydrocarbon feedstock vaporizer external of the steam cracking furnace for vaporizing the hydrocarbon feedstock before the superheating of the feedstock in the hydrocarbon feedstock superheating means or the hydrocarbon feedstock superheater of the steam cracking furnace, the hydrocarbon feedstock vaporizing means or the hydrocarbon feedstock vaporizer being connected to the hydrocarbon feedstock superheating means or the hydrocarbon feedstock superheater.

In an embodiment, the hydrocarbon feedstock vaporizing means or the hydrocarbon feedstock vaporizer include a hydrocarbon feedstock pump for pressurizing hydrocarbon feedstock, a heat exchanger and a medium pressure distillation column connected to the heat exchanger, and wherein the heat transfer medium for the medium pressure distillation column comprises medium pressure steam.

In an embodiment, the hydrocarbon feedstock vaporizing means or the hydrocarbon feedstock vaporizer include a multi stage heat exchanging means or a multi stage heat exchanger.

In an embodiment, the multistage heat exchanging means or multistage heat exchanger comprises at least one of a first heat exchanger stage using low pressure steam, a second heat exchanger stage using medium pressure steam, a third heat exchanger stage using high pressure steam.

The following includes definitions of various terms and phrases used throughout this specification.

The terms "about" or "approximately" are defined as being close to as understood by one of ordinary skill in the art. In one non-limiting embodiment, the terms are defined to be within 10%, preferably, within 5%, more preferably, within 1%, and most preferably, within 0.5%.

The terms "wt. %", "vol. %", or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, steps etc., disclosed throughout the specification. It is also to be understood that a description on a product/composition/process/system comprising certain components also discloses a product/composition/system consisting of these components. The product/composition/process/system consisting of these components may be advantageous e.g., in that it offers a simpler, more economical process for the preparation of the product/composition. Similarly, it is also to be understood that, for example, a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

In the context of the present invention, 15 Embodiments are now described. Embodiment 1 is a process for steam cracking hydrocarbon feedstock in a steam cracking furnace. The process includes the steps of vaporizing the hydrocarbon feedstock, using hydrocarbon feedstock vaporizing means or a hydrocarbon feedstock vaporizer external of the steam cracking furnace, wherein the hydrocarbon feedstock vaporizing means are heated with a heat transfer medium having a temperature less than or equal to 350° C.; feeding the vaporized hydrocarbon feedstock to hydrocarbon feedstock superheating means or the hydrocarbon feedstock superheater in the convection section of the steam cracking furnace; superheating the vaporized hydrocarbon feedstock using flue gas from a radiant section of the steam cracking furnace in hydrocarbon feedstock superheating means or the hydrocarbon feedstock superheater in a convection section of the steam cracking furnace; superheating steam from a steam generator using the flue gas from a radiant section of the steam cracking furnace in second heat exchanging means or a second heat exchanger; and steam cracking the superheated hydrocarbon feedstock into cracked gas in a fired tubular reactor in the radiant section of the steam cracking furnace. Embodiment 2 is the process according to embodiment 1, wherein the vaporizing of the hydrocarbon feedstock includes pressurizing the hydrocarbon feedstock using a hydrocarbon feedstock pump; preheating the pressurized hydrocarbon feedstock in a first heat exchanger; and distilling the preheated hydrocarbon feedstock in a medium pressure distillation column connected to the first heat exchanger, wherein the medium pressure distillation column is operated at an absolute pressure in a range of 0.7 to 1.2 MPa. Embodiment 3 is the process according to embodiment 2, further comprising distilling the hydrocarbon feedstock in the medium pressure distillation column using medium pressure stripping steam having an absolute pressure in a range of 0.8-2.0 MPa. Embodiment 4 is the process according to one of embodiments 2 or 3, wherein the medium pressure stripping steam has a temperature in a range of 180-350° C. Embodiment 5 is the process according to any of embodiments 2 to 4, wherein the heat exchanger is heated using a heat transfer medium having a temperature in a range of 160-350° C. Embodiment 6 is the process according to any one of embodiments 2 to 5, wherein the vaporizing the hydrocarbon feedstock further includes the steps of preheating fluid components of the hydrocarbon feedstock from the medium pressure distillation column through heat exchange in a second heat exchanger, and distilling the hydrocarbon feedstock in a low pressure distillation column into at least one of a light distillate fraction and a middle distillate fraction and a heavy distillate fraction, wherein the low pressure distillation column is operated at an absolute pressure in a range of 0.1-0.6 MPa. Embodiment 7 is the process according to embodiment 6, further including the step of distilling the hydrocarbon stream in a low pressure distillation column using low pressure stripping steam having an absolute pressure in a range of 0.1-0.7 MPa. Embodiment 8 is the process according to embodiment 1, wherein the vaporizing the hydrocarbon feedstock comprises preheating in a multistage heat exchanging means or multistage heat exchanger. Embodiment 9 is the process according to any of embodiments 1 to 8, wherein the preheating in the multistage heat exchanging means or multistage heat exchanger comprises at least one of preheating the hydro carbon in a first heat exchanger stage using low pressure steam; preheating the hydrocarbon in a second heat exchanger stage using medium pressure steam; or preheating the hydrocarbon in a third heat exchanger stage using high pressure steam. Embodiment 10 is the process according to any of embodiments 1 to 9 further including the step of injecting steam in at least one steam injection inlet in the hydrocarbon feedstock stream multistage heat exchanging means or multistage heat exchanger. Embodiment 11 is the process according to any of embodiments 1 to 10, further including the step of preheating boiled feed water for the steam generator using flue gas from the radiant section of the steam cracking furnace in a boiler feed water preheating means or a boiler feed water preheater.

Embodiment 12 is a system for steam cracking hydrocarbon feedstock. The system includes a steam generator for producing steam; a steam cracking furnace including a radiant section for steam cracking the hydrocarbon feedstock and a convection section having hydrocarbon feedstock super heating means or the hydrocarbon feedstock super heater for superheating the hydrocarbon feed stock, and steam superheating means or a steam superheater for superheating the steam, and cooling means or cooler or a cooler for cooling the cracked gas from the radiant section; hydrocarbon feedstock vaporizing means or a hydrocarbon feedstock vaporizer of a hydrocarbon feedstock vaporizer external of the steam cracking furnace, for vaporizing the hydrocarbon feedstock before the superheating of the feedstock in the hydrocarbon feedstock superheating means or the hydrocarbon feedstock superheater of the steam cracking furnace, the hydrocarbon feedstock vaporizing means or the hydrocarbon feedstock vaporizer being connected to the hydrocarbon feedstock superheating means or the hydrocarbon feedstock superheater. Embodiment 13 is the steam cracking system according to embodiment 12, wherein the hydrocarbon feedstock vaporizing means or the hydrocarbon feedstock vaporizer includes a hydrocarbon feedstock pump for pressurizing hydrocarbon feedstock; a first heat exchanger connected to the pump, and a medium pressure distillation column connected to the heat exchanger for distilling the heated hydrocarbon feedstock at medium pressure in a range of 0.7 to 1.2 MPa. Embodiment 14 is the steam cracking system according to embodiment 12, wherein the hydrocarbon feedstock vaporizing means or the hydrocarbon feedstock vaporizer includes a multi stage heat exchange exchanging means or a multi stage heat exchanger for preheating and vaporizing the hydrocarbon feedstock. Embodiment 15 is the steam cracking system according to embodiment 14, wherein the multistage heat exchanging means or multistage heat exchanger includes at least one of a first heat exchanger stage using low pressure steam, a second heat exchanger stage using medium pressure steam, a third heat exchanger stage using high pressure steam.

Other objects, features and advantages of the present invention will become apparent from the following figures, detailed description, and examples. It is noted that the invention relates to all possible combinations of features described herein, preferred in particular are those combinations of features that are present in the claims. It will therefore be appreciated that all combinations of features relating to the composition, process, system according to the invention; all combinations of features relating to the process according to the invention and all combinations of features relating to the system according to the invention and features relating to the process according to the invention are described herein. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE FIGURES

FIG. 1 shows a schematic diagram of a hydrocarbon steam cracking system according to the state of the art.

FIG. 1a shows a schematic diagram of a convection section of a hydrocarbon steam cracking system according to the state of the art.

DETAILED DESCRIPTION OF EMBODIMENTS

Figure 2:
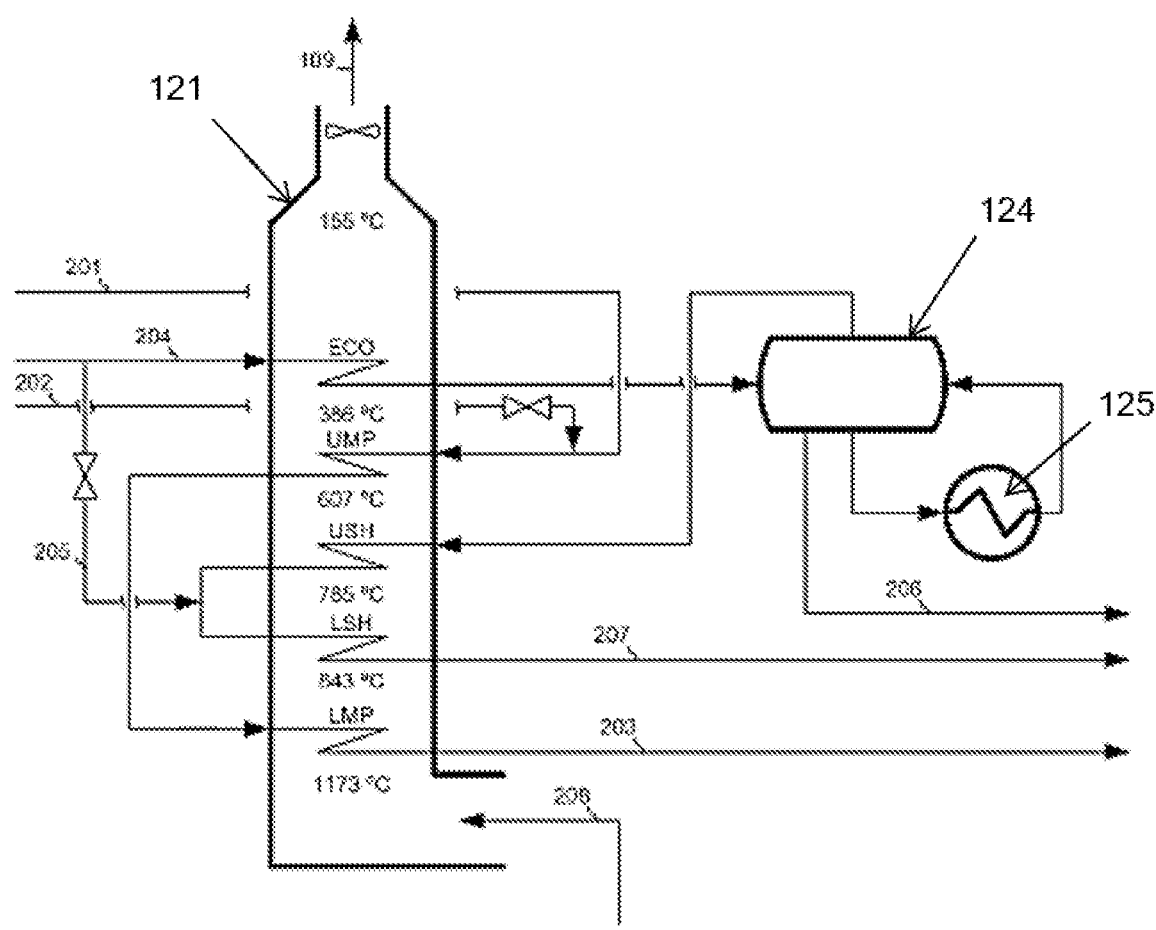
FIG. 2 shows a schematic diagram of a convection section of a hydrocarbon steam cracking system according to an embodiment of the invention.

FIG. 1 shows a principal arrangement according to the state of the art of a steam cracking furnace system (derived from Ullman, Encyclopedia of industrial chemistry, p. 470 2012 Wiley-VCH Verlag GmbH & Co. KGaA, Weinheim). The system comprises a steam cracking furnace 120, having a radiant section 122, and a convection section 121. The radiant section has burners 129 for heating a fired tubular reactor 123 wherein the actual steam cracking of the hydrocarbon feedstock occurs. The flue gas from the burners 129 flows past the fired tubular reactor 123 to provide the necessary energy for the endothermic steam cracking process within the tubular reactor 123. The flue gas subsequently 108 flows to the convection section 121 of the steam cracking furnace 120.

Hydrocarbon feedstock can be introduced in an inlet stream 101, which is led to convection banks in 127 for superheating in the convection section 121 of the steam cracking furnace. The convection banks 127 will be detailed more in FIG. 1a.

Boiler feed water is introduced in stream 104 which is also heated in the convection banks 127 and transferred to a steam drum 124.

Steam from the steam drum 124 is superheated in the convection banks 127 to form a stream of superheated high pressure (VHP) steam 107. Steam 102 is injected in the hydrocarbon stream for mixing and performing the steam cracking process in the fired tubular reactor 123. VHP steam normally has an absolute pressure in a range of 5.0-16.0 MPa.

The cracked hydrocarbon gas flows from the fired tubular reactor 123 to a transfer line heat exchanger 125, where it is cooled and discharged in stream 128 for further processing, i.e. distillation. The heat from the cracked gas recovered in the transfer line heat exchanger 125 is transferred to the steam drum 124.

FIG. 1a shows an example of a convection section 121 of a steam cracking furnace. In this example a base case of the convection section of a steam cracking furnace processing 45 t/h of light hydrocarbon feedstock mixed with 18 t/h of dilution steam is presented. Hot flue gas enters the convection section at a temperature of 1173° C., where the heat is recovered by preheating the feedstock in convection bank LMP and preheating boiler feed water in convection bank ECO and superheating the steam, generated by the transfer line heat exchanger 125, in convection banks USH and LSH.

Light hydrocarbon feedstock of naphtha 101 is preheated and vaporized in Feed Pre Heater FPH, mixed with dilution steam 102 and further heated in Upper Mixed Preheater UMP and further heated in in Lower Mixed Preheater LMP to 612° C. before it enters via stream 103 in the fired tubular reactor 123 in the radiant section 122 of the furnace 120. Additional heat is recovered by preheating boiler feed water 104 in the Economizer ECO convection bank and superheating steam from the steam drum 124 in the Upper Superheater USH after that some boiler feed water 104 is added to quench the temperature, which is further superheated in the Lower Superheater LSH convection bank, where superheated very high pressure steam is produced (12.0 MPa, 470° C.).

Process temperatures and transferred heating power of this example are shown in table 1 below.

TABLE 1

| Equipment | Process inlet temperature °C. | Process outlet temperature °C. | Flue gas inlet temperature °C. | Flue gas outlet temperature °C. | Transferred Heat $MW_{th}$ |
|---|---|---|---|---|---|
| FPH | 81 | 207 | 336 | 155 | 6.35 |
| ECO | 97 | 147 | 401 | 336 | 2.34 |
| UMP | 185 | 368 | 621 | 401 | 8.22 |
| USH | 329 | 447 | 765 | 621 | 5.61 |
| LSH | 387 | 470 | 843 | 765 | 3.10 |
| LMP | 368 | 613 | 1173 | 843 | 13.71 |
| Total |  |  |  |  | 39.32 |

The total power available for high grade, high temperature, high pressure steam production (heat transferred in ECO, USH and LSH) is 11.05 $MW_{th}$.

In FIG. 2, a comparative example convection section 221 is shown which can be utilized when the hydrocarbon feedstock or naphtha is supplied 201 to the steam cracking furnace as a vapor at the required pressure in the range of 0.6-0.8 MPa. The boiler water feed 204 supplies water for the steam drum 124. The steam drum 124 supplies the upper superheater convection bank USH with steam, which is superheated and passed on to the lower superheater convection bank LSH where it is further superheated. The feedstock preheating convection bank FPH as shown in FIG. 1a is no longer required, allowing the other convection banks ECO, USH, and LSH related to steam generation, to obtain a higher heat transfer capacity as shown in table 2 right hand column below, while the total thermal power converted in the convection section remains unchanged, 39.32 MW.

TABLE 2

| Equipment | Process inlet temperature °C. | Process outlet temperature °C. | Flue gas inlet temperature °C. | Flue gas outlet temperature °C. | Transferred Heat $MW_{th}$ |
|---|---|---|---|---|---|
| ECO | 97 | 235 | 386 | 155 | 8.11 |
| UMP |  |  | 607 | 386 | 8.22 |
| USH | 330 | 447 | 785 | 607 | 6.90 |
| LSH | 417 | 470 | 843 | 785 | 2.28 |
| LMP |  |  | 1173 | 843 | 13.71 |
| Total |  |  |  |  | 39.22 |

Comparing Table 1 and 2 reveals that the duties for UMP and LMP are not changed and the FPH is not present in this case, the total power of the convection section remains (almost) the same at 39.2 MW compared to the 39.3 MW base case of FIG. 1a. Additional heat has to be absorbed by the ECO, USH and LSH convection banks in this example. In this case the Very High Pressure steam production is raised from 42.0 t/h to 48.9 t/h. So a clear effect of redimensioning of the convection banks in the furnace and feeding it with vapor naphtha can be that VHP steam production is increased by (48.9-42.0)/42.0*100%=16%.

In this case the total power available for high grade, high temperature, high pressure VHP steam production (heat transferred in ECO, USH and LSH) is 17.29 $MW_{th}$.

The corresponding power increase for the VHP steam production from 97° C. water to 470° C. VHP steam is 6.3 $MW_{th}$.

A pre-condition for obtaining the increased VHP steam is the introduction of vaporized naphtha into the steam cracking furnace 120. The naphtha needs to be vaporized and supplied to the steam cracking furnace at pressures in a range of 0.6-0.8 MPa as described below.

Naphtha can be vaporized and supplied to the steam cracking furnace at pressures in a range of 0.6-0.8 Pa as described below.

Figure 3:
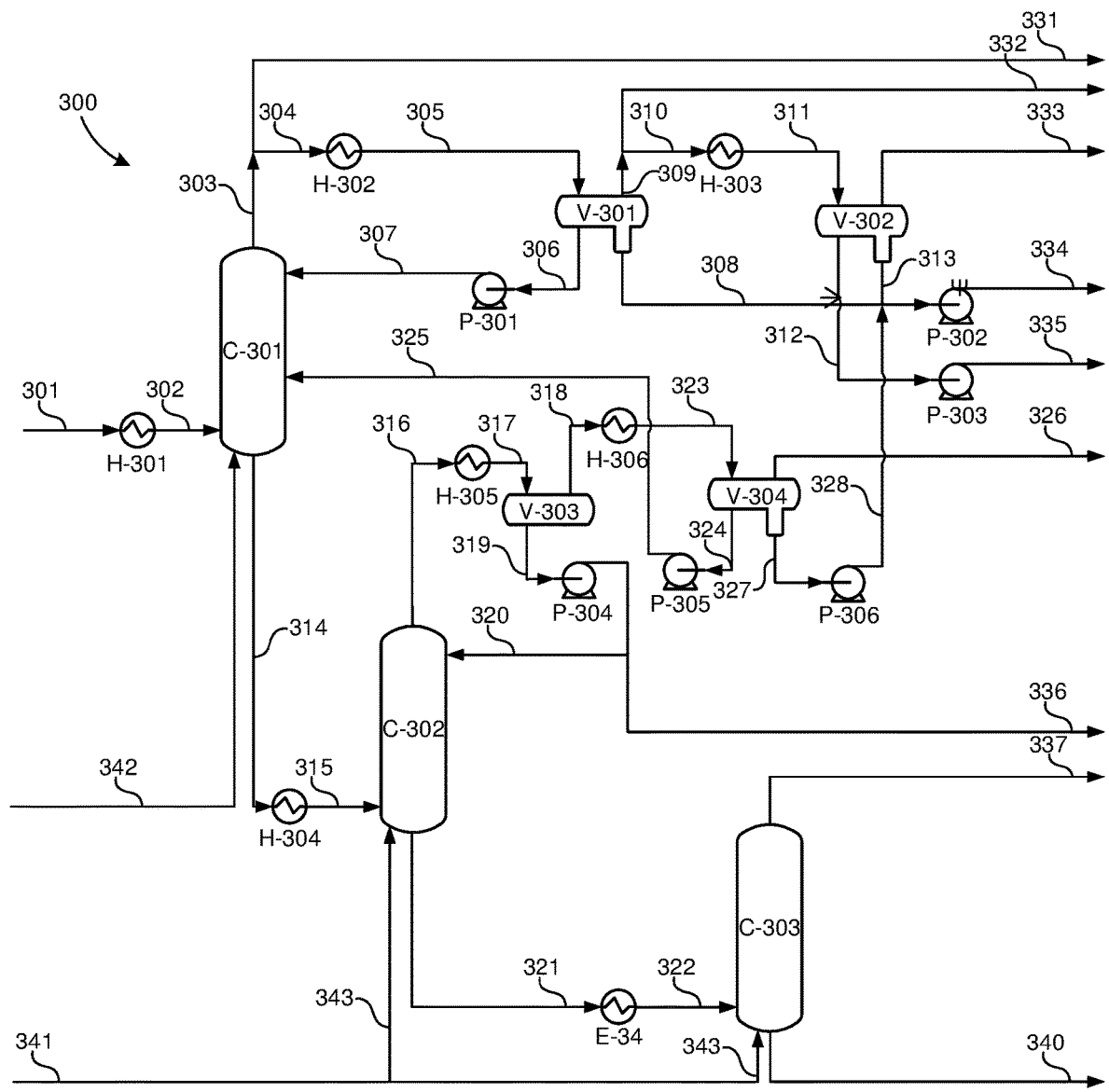
FIG. 3 shows a schematic diagram of producing a vapor hydrocarbon feedstock product from a crude hydrocarbon feedstock stream.

FIG. 3 shows a refinery process 300 which is capable of providing hydrocarbon feedstock vapor, i.e. naphtha, from crude hydrocarbon feedstock such as crude oil, a hydrocracker product, a catalytic cracker product or a coker product to the steam cracking furnace of FIG. 2 at a sufficiently high temperature and pressure.

In this preferred solution the refinery units providing hydrocarbon feedstock to the steam cracker 120 produce their products at sufficient pressure to be mixed with stream 202 independent from the steam cracking furnace 120 and deliver these to the UMP (FIG. 2) directly. The hydrocarbon fractionating system of these refinery units should be properly designed for that to do so efficiently. An example for the crude hydrocarbon feedstock distiller is provided by FIG. 3.

Crude hydrocarbon feedstock is desalted, and preheated as is typical for the state of the art crude distillers (including extended preheating against products) to stream 301, this stream is pumped at medium pressure using a crude hydrocarbon feedstock pump to heat exchanger H-301, and is further heated in the heat exchanger H-301 to a temperature in the range of 220-350° C. in stream 302 depending on the composition of the crude oil, desired cut point of the naphtha to the steam cracker and the pressure of the column that is governed by the requirements of the steam cracker furnace.

The heat exchanger H-301 can be a furnace, a steam heater or any other type of heater, heated by any suitable heat source such as for example medium pressure steam or quench oil from the steam cracking furnace which is normally available at a temperature of around 160° C. The medium pressure (MP) steam normally has an absolute pressure in a range of 0.8-2.0 MPa.

The preheated hydrocarbon feedstock stream 302 is sent to a medium pressure distillation column C-301, operated at an absolute pressure in the range of 0.7 to 1.2 MPa. Its pressure is mainly governed by the vapor naphtha pressure required by the steam cracker and the pressure drop in the transport line. The pressure at which the crude hydrocarbon feedstock is pumped to the heat exchanger H-301 must be sufficient to overcome the pressure drop in the heat exchanger and to obtain the required pressure in the medium pressure distillation column C-301 in the range of 0.7 to 1.2 MPa. This pumping pressure may vary depending on the heat exchanger type.

The crude hydrocarbon feedstock in distillation column C-301 can be heated using further heat exchangers, reboilers or stripping steam. Medium pressure stripping steam 342 can be added to the crude hydrocarbon feedstock in a temperature range of 180-350° C., at the bottom of this medium pressure distillation column C-301. A liquid hydrocarbon feedstock stream 325 from an atmospheric distillation column C-302, can be added from a subsequent stage, i.e. distillation column C-302 as will be described below.

At the bottom of medium pressure distillation column C-301 a product is taken containing mainly middle distillates and heavier fractions of the crude oil in stream 314. At the top the naphtha and lighter components, including the steam 303 are taken. Part 304 of this stream 303 is condensed in heat exchanger H-302 and separated in a liquid 306 in separator V-301 and pumped back as liquid reflux 307 on column C-301 with pump P-301.

The vapor product 309 from separator V-301 can be sent directly to the steam cracker 120 as hydrocarbon feedstock stream 332 similar to lighter hydrocarbon feedstock stream 331, where there is a slight advantage to keep the heavier hydrocarbon feedstock stream 332 separate to crack them under different conditions. It can be advantageous to steam crack the lighter hydrocarbon feedstock stream 331 under more severe conditions than heavier hydrocarbon feedstock stream 332, because of the lighter components in hydrocarbon feedstock stream 331. It is also possible to fully or partly mix the hydrocarbon feedstock 331, 332 streams to make better use of the furnace capacity in the steam cracker 120.

It is also possible to produce a liquid naphtha. For this the water from lighter naphtha stream 310 can be condensed out in condenser H-303 into stream 311. Because of the higher pressure this system is operated at a higher pressure compared to conventional crude distillers, the temperature is higher (in the range of 130-180° C.), releasing more valuable heat which is worth recovering then in a traditional crude distiller (<100° C.). Vaporization unit V-302 separates stream 311 in a sour water fraction 313 that together with the sour water from V-301 in stream 308 is sent for treatment, an unstable(ized) naphtha fraction 312 which can be pumped by P-303 to a naphtha stabilizer column and an LPG fraction 333 can be sent to a gas plant or fuel gas network.

The bottom product in stream 314 from medium pressure distillation column C-301 is further heated to a temperature in the range of 320-360° C. by heat exchanger H-304 and added to atmospheric distillation column C-302 together with low pressure steam 343 or low pressure stripping steam. Low pressure steam normally has an absolute pressure in a range of 0.1-0.7 MPa. Atmospheric distillation column C-302 operates at an absolute pressure below 0.6 MPa and above atmospheric pressure (0.1 MPa). Atmospheric distillation column C-302 produces a middle distillate fraction 316 at the top. Vapors from distillate collection vessel V-303 are sent to decanter V-304, where they are condensed by condenser H-305. Decanter V-304 separates this in a vapor fraction 326 to be sent to a gas treatment plant, and sour water 328 to be sent for treatment together with other sour water streams 313, 308. The liquid fraction 324 is pumped by pump P-305 to the medium pressure distillation column C-301 via stream 325 as described.

The bottom product 321 of atmospheric distillation column C-302 in stream 321 is treated by a conventional vacuum distillation column C-303 as common in crude distillation units (not all equipment is shown) to produce middle distillate vapors 337, and light vacuum gas oil, heavy vacuum gas oil and vacuum residue 340.

From the distillation column C-302, volatile components are separated in distillate collection vessel V-303, and supplied 324 via condenser H-306 and decanter V-304, and pressurized P-305 via stream 325 to the medium pressure distillation column C-301.

All the above is to ensure that the steam cracker 120 can process a pressurized, vaporized naphtha/hydrocarbon feedstock stream in a steam cracking furnace 120 as shown in FIG. 2.

Hydrocrackers and FCC units typically have a main fractionator column, which can be replaced by medium pressure distillation columns C-301 and atmospheric distillation column C-302 with all their associated equipment to also provide pressurized, vaporized hydrocarbon feedstock to a steam cracker furnace 120 as shown in FIG. 2.

Figure 4:
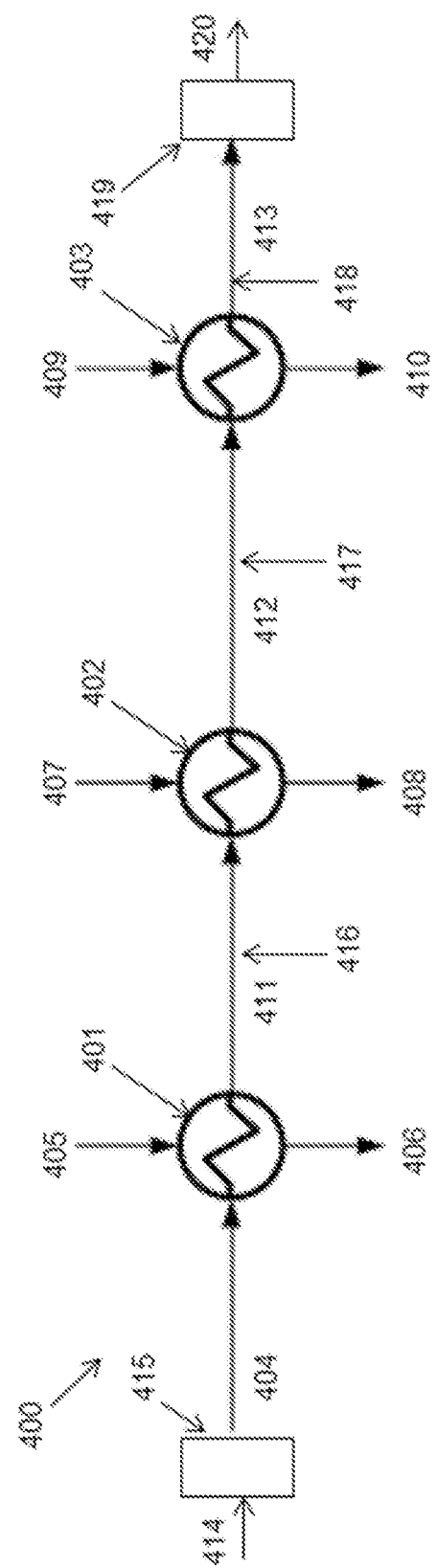
FIG. 4 shows an alternative process for vaporizing hydrocarbon feedstock according to an embodiment of the invention.

FIG. 4 shows an example of an alternative process 400 of vaporizing naphtha using low grade steam.

In the process 400 a first heat exchanger 401 heats liquid naphtha 404 using low pressure steam 405 resulting in heated naphtha stream. A second heat exchanger 402 heats the naphtha using medium pressure steam, and the third heat exchanger 403 heats the naphtha using high pressure steam, which has an absolute pressure in a range of 2.5-4.5 MPa. The naphtha in this process is vaporized and the vaporized naphtha 411 can be fed to the hydro cracking system hydrocarbon inlet 201.

The low, medium and high pressure steam 405, 407, 409 condensates in the heat exchangers 401, 402, 403, which condensate can be recovered in condensate streams 406, 408, 410 respectively.

Exemplary temperatures and pressures and corresponding heat sources are indicated in the table 3 below.

TABLE 3

| Stage | Start temperature ° C. | Final Temperature ° C. | Power (MW$_{th}$) | Heat source |
|---|---|---|---|---|
| 401 | 81 | 138 | 1.85 | 0.5 MPa$_a$ steam (405) |
| 402 | 138 | 193 | 2.77 | 1.8 MPa$_a$ steam (407) |
| 403 | 193 | 207 | 1.73 | 4.0 MPa$_a$ steam (409) |
| | | TOTAL | 6.35 | |

From table 3 it is evident that in this example for generating vaporized naphtha, a power of 6.35 MW$_{th}$ is required, which is offset against the 6.3 MW$_{th}$ which is required for the VHP steam production. Thus using the low grade LP and MP steam, a gain of 16% VHP steam is attained.

Because of its higher temperature a unit of energy of VHP steam is more valuable than a similar unit of energy of medium and lower pressure steam and the net effect of this solution is that the same units of energy of LP, MP and HP steam are transformed to VHP steam, with more value. In the example, the pressure ranges for the LP, MP, HP steam pressure can be taken in the ranges 0.1-0.7 MPa, 0.8-2.0 MPa, and 2.5-4.5 MPa respectively for obtaining similar results.

The required pressure of the hydrocarbon feedstock can be obtained by using a pump 415 which pumps hydrocarbon feedstock from a hydrocarbon feedstock supply 414 to the required pressure in inlet 404 of the multistage heat exchanging process 400. A separator 419 may be present in the outlet 413 for separating liquids, i.e. water and heavier (higher molecular weight) not vaporized hydrocarbons from the already vaporized naphtha or hydrocarbon feedstock before it is transferred in a vaporized hydrocarbon feedstock stream 420 to the hydrocarbon feedstock inlet 202 of the steam cracking furnace 120.

The multistage heat exchanging process 400 can advantageously be provided with additional low or medium grade (LP, MP) steam injection inlets in the intermediate streams 411, 412, and even in the outlet 413. Injecting the intermediate streams 411, 412 and 413 with low or medium grade (LP, MP) steam enhances and fine tunes the vaporizing process of the hydrocarbon feedstock with relatively cheap steam while the heat requirement in the heat exchangers 401-403 is reduced. Thus less high pressure steam 409 may be required especially in stage 403.

REFERENCE NUMERALS 101, 201 hydrocarbon feedstock inlet stream
102, 202 boiling water stream 103, 203 superheated hydrocarbon feedstock
104, 204 boiler feed water inlet
120 steam cracking furnace
121 convection section
122 radiant section
123 fired tubular reactor
124 steam drum
125 transfer line heat exchanger
128 cracked gas exhaust
129 burners
130 hot cracked gas
301 crude oil
302 heated crude
303 naphtha distillate
304 naphtha part for condensing and reflux
305 heated naphtha part for condensing and reflux
306 liquid
307 reflux
308, 313, 334 sour water
309 vapor product
310 lighter naphtha stream
311 condensed water stream
312, 335 liquid naphtha
314 heavier fractions
315 heated heavier fractions
316 middle distillate fraction
325 liquid middle distillate
328 sour water
331 naphtha
332 light naphtha
333, 326 liquid petroleum gas
336 middle distillates, kerosene, diesel
337 middle distillate vapors
340 vacuum residue
342 medium pressure stripping steam
343 low pressure stripping steam
401, 402, 403 heat exchanger stage
404 hydrocarbon feedstock inlet stream
405 low pressure steam
406, 408, 410 condensate stream
407 medium pressure steam
409 high pressure steam
411, 412, 413 interconnecting hydrocarbon feedstock streams
414 hydrocarbon feedstock supply
415 pump
416, 417, 418 steam injection inlets
419 separator
420 vaporized hydrocarbon feedstock stream
C-301 medium pressure distillation column
C-302 atmospheric distillation column
C-303 vacuum distillation column
H-301 heat exchanger
H-302 heat exchanger
H-303 condenser
H-305 condenser
P-303 pump
P-305 pump
V-301 vaporization unit
V-302 vaporization unit
V-303 distillate collection vessel
V-304 decanter

The invention claimed is:

1. A process for steam cracking hydrocarbon feedstock in a steam cracking furnace, the process comprising:
vaporizing the hydrocarbon feedstock, using hydrocarbon feedstock vaporizing means or the hydrocarbon feedstock vaporizer external of the steam cracking furnace, wherein the hydrocarbon feedstock vaporizing means are heated with a heat transfer medium having a temperature of less than or equal to 350° C.;
feeding the vaporized hydrocarbon feedstock to the hydrocarbon feedstock superheating means or the hydrocarbon feedstock superheater in the convection section of the steam cracking furnace;
superheating the vaporized hydrocarbon feedstock using flue gas from a radiant section of the steam cracking furnace in hydrocarbon feedstock superheating means or the hydrocarbon feedstock superheater in a convection section of the steam cracking furnace;
superheating steam from a steam generator using the flue gas from a radiant section of the steam cracking furnace in second heat exchanging means;
steam cracking the super-heated hydrocarbon feedstock into cracked gas in a fired tubular reactor in the radiant section of the steam cracking furnace;
wherein the vaporizing of the hydrocarbon feedstock comprises the steps of:
pressurizing the hydrocarbon feedstock using a hydrocarbon feedstock pump;
preheating the pressurized hydrocarbon feedstock in a first heat exchanger;
preheating boiled feed water for the steam generator using flue gas from the radiant section of the steam cracking furnace in a boiler feed water preheating means;
distilling the preheated hydrocarbon feedstock in a medium pressure distillation column connected to the first heat exchanger, wherein the medium pressure distillation column is operated at an absolute pressure in a range of 0.7 to 1.2 MPa;
wherein the vaporizing the hydrocarbon feedstock further comprises:
preheating fluid components of the hydrocarbon feedstock from the medium pressure distillation column through heat exchange in a second heat exchanger, and
distilling the hydrocarbon feedstock in a low pressure distillation column into at least one of a light distillate fraction and a middle distillate fraction and a heavy distillate fraction,
wherein the vaporizing the hydrocarbon feedstock comprises preheating in a multistage heat exchanging means; and
wherein flue gas enters the convection section at a temperature of 1173° C., wherein the heat is recovered by preheating the feedstock in a convection bank and preheating boiler feed water in convection bank and superheating the steam.

2. The process according to claim 1, wherein the medium pressure distillation column is operated at an absolute pressure of 1.2 MPa, and wherein the temperature of the steam cracking furnace is 350° C.

3. The process according to claim 2, wherein the pressure stripping steam has an absolute pressure of 2.0 MPa.

4. The process according to claim 3, wherein the medium pressure stripping steam has a temperature of 350° C.

5. The process according to claim 4, wherein the heat exchanger is heated using a heat transfer medium having a temperature of 350° C.

6. The process according to claim 1, further comprising distilling the hydrocarbon stream in a low pressure distillation column using low pressure stripping steam having an absolute pressure of 0.1 MPa.

7. A process for steam cracking naphtha in a steam cracking furnace, the process consisting of the steps of:

vaporizing the naphtha, using hydrocarbon feedstock vaporizing means or the hydrocarbon feedstock vaporizer external of the steam cracking furnace, wherein the hydrocarbon feedstock vaporizing means are heated with a heat transfer medium having a temperature less than or equal to 3500° C.;
feeding the vaporized naphtha to the hydrocarbon feedstock superheating means or the hydrocarbon feedstock superheater in a convection section of the steam cracking furnace;
superheating the vaporized naphtha using flue gas from a radiant section of the steam cracking furnace in hydrocarbon feedstock superheating means or the hydrocarbon feedstock superheater in a convection section of the steam cracking furnace;
superheating steam from a steam generator using the flue gas from a radiant section of the steam cracking furnace in second heat exchanging means;
steam cracking the super-heated naphtha into cracked gas in a fired tubular reactor in the radiant section of the steam cracking furnace;
wherein the vaporizing of naphtha consists of:
pressurizing the naphtha using a hydrocarbon feedstock pump;
preheating the pressurized naphtha in a first heat exchanger; and
distilling the preheated naphtha in a medium pressure distillation column connected to the first heat exchanger, wherein the medium pressure distillation column is operated at an absolute pressure of 0.7 MPa;
distilling the distilled-preheated naphtha in the medium pressure distillation column using medium pressure stripping steam having an absolute pressure of 2.0 MPa;
preheating fluid components of the naphtha from the medium pressure distillation column through heat exchange in a second heat exchanger, and
distilling the fluid components in a low pressure distillation column into at least one of a light distillate fraction and a middle distillate fraction and a heavy distillate fraction;
distilling the fluid components in the low pressure distillation column using low pressure stripping steam having an absolute pressure of 0.1 MPa;
injecting steam in at least one steam injection inlets in hydrocarbon feedstock stream multistage heat exchanging means;
wherein the vaporizing the naphtha consists of preheating in the multistage heat exchanging means;
wherein the medium pressure stripping steam has a temperature of 180° C.; Wherein the heat exchanger is heated using a heat transfer medium having a temperature of 160° C.;
wherein the low pressure distillation column is operated at an absolute pressure of 0.1 MPa; wherein the preheating in the multistage heat exchanging means consists of:
preheating the naphtha in a first heat exchanger stage using low pressure steam;
preheating the naphtha in a second heat exchanger stage using medium pressure steam; and
preheating the naphtha in a third heat exchanger stage using high pressure steam.

8. The process according to claim 1, wherein the feed is naphtha.

9. The process according to claim 2, further comprising preheating boiled feed water for the steam generator using flue gas from the radiant section of the steam cracking furnace in a boiler feed water preheating means.

10. The process according to claim 3, further comprising preheating boiled feed water for the steam generator using flue gas from the radiant section of the steam cracking furnace in a boiler feed water preheating means.

11. The process according to claim 4, further comprising preheating boiled feed water for the steam generator using flue gas from the radiant section of the steam cracking furnace in a boiler feed water preheating means.

12. The process according to claim 5, further comprising preheating boiled feed water for the steam generator using flue gas from the radiant section of the steam cracking furnace in a boiler feed water preheating means.

13. The process according to claim 1, further comprising preheating boiled feed water for the steam generator using flue gas from the radiant section of the steam cracking furnace in a boiler feed water preheating means.

* * * * *